United States Patent [19]

Yoshikawa et al.

[11] Patent Number: 5,567,561
[45] Date of Patent: Oct. 22, 1996

[54] COATING AGENTS FOR ELECTROPHOTOGRAPHY AND ELECTROPHOTOGRAPHY CARRIERS PREPARED BY USING THEM

[75] Inventors: Yuji Yoshikawa, Annaka; Mitsuhiro Takarada, Takasaki, both of Japan

[73] Assignee: Shin-Etsu Chemical Co., Ltd., Tokyo, Japan

[21] Appl. No.: 300,011

[22] Filed: Sep. 2, 1994

[30] Foreign Application Priority Data

Sep. 2, 1993 [JP] Japan .................... 5-242102

[51] Int. Cl.$^6$ .................................. G03G 9/113
[52] U.S. Cl. ................ 430/106.6; 430/108; 430/137; 428/405
[58] Field of Search ................ 430/110, 108, 430/106.6, 137; 428/405

[56] References Cited

U.S. PATENT DOCUMENTS

| | | | |
|---|---|---|---|
| 3,798,167 | 3/1974 | Kukla et al. | 430/110 |
| 4,600,677 | 7/1986 | Hoffend et al. | 430/108 |
| 5,068,301 | 11/1991 | Okamura et al. | 528/15 |
| 5,368,969 | 11/1994 | Yoshikawa et al. | 430/108 |

FOREIGN PATENT DOCUMENTS

| | | | |
|---|---|---|---|
| 2219447 | 9/1974 | France. | |
| 60-93455 | 5/1985 | Japan | 430/110 |
| 1466344 | 3/1977 | United Kingdom. | |
| 2119108 | 11/1993 | United Kingdom. | |

OTHER PUBLICATIONS

Derwent Abstracts No. 93-014444 (JP 43-43366).
Abstract of FR 2,219,447.

*Primary Examiner*—Christopher D. Rodee
*Attorney, Agent, or Firm*—Millen, White, Zelano, & Branigan, P.C.

[57] ABSTRACT

Coating agents for electrophotography carriers are disclosed which are resistant to wear, peel-off, cracks, and prevent the occurrence of a spent phenomenon, and which possess a durability for a long period of use and a superior stability in the carrier charge characteristics. The coating provides long lifetime electrophotography carriers which possess reduced temperature dependency and improved stability in the carrier charge characteristics.

The coating agents for the electrophotography carrier are characterized by having an organopolysiloxane expressed by the formula below as a main component:

$$R_a^f R_b^1 Si(OR^2)_c O_{(4-(a+b+c))/2} \qquad \text{I}$$

wherein
  $R^f$ is $C_p F_{2p+1} Q$;
  p is 1–12;
  Q is a bivalent organic group with 2–12 carbon atoms;
  $R^1$ is alkyl with 1–12 carbon atoms or phenyl;
  $R^2$ is H or alkyl with 1–6 carbon atoms; and
  a, b and c are numbers satisfying the following conditions:
    $0 < a \leq 1$, $0 \leq b < 2$, $0 \leq c \leq 3$, and $0 \leq a+b+c \leq 4$.

21 Claims, No Drawings

COATING AGENTS FOR ELECTROPHOTOGRAPHY AND ELECTROPHOTOGRAPHY CARRIERS PREPARED BY USING THEM

SUMMARY OF THE INVENTION

This invention relates to coating agents for use in electrophotography, particularly agents with a superior endurance in reproduction and superior charge characteristics. The invention further relates to electrophotography carriers prepared by using the coating agents.

As is well known, developers for two-component type dry copying machines contain two main particulate components: fine particulate toners and larger sized carrier particles. By mixing and stirring these two components together, each toner and carrier becomes electrostatically charged with different signs from each other. The visible image is formed by electrostatically depositing the charged toner on an electrostatic latent image formed on a photosensitive substance. The copying is completed by transferring this image to a transfer sheet and fixing it.

In this case, oxidized or unoxidized iron powders are typically used as carriers. However, when these carriers are mixed with the toner particles, their triboelectric properties toward the toner are insufficient. In addition, during use the toner particles tend to stick to the surface of the carrier particles forming a toner film thereon (which is called spent phenomenon). As a result, the charge characteristics of the carrier disadvantageously vary with time and the lifetime of the developer becomes shortened.

In order to prevent such disadvantages, there is a popular trend to cover the surface of the carrier with resins such as fluorine resins, acrylic resins, styrene-acryl copolymers, silicone resins, and polyester resins. However, in the cases where polyester resins having hydroxyl groups and acrylic resins are used as the coating, crosslinking is performed through the use of, for example, isocyanates and melamines (Japanese Patent applications Kokai (laid open) 59-53875, and 60-59369). If incomplete crosslinking occurs, residual hydroxyl groups and isocyanate groups will be present, which worsen the charge characteristics.

When acrylic resins and styrene-acryl copolymers are used as the coating, the initial charge characteristics are superior. However, the fragile coating films have the disadvantage of low endurance. The fluorine resins and silicone resins, on the other hand, possess a low surface energy. Therefore, these coatings are receiving attention from the view point of reduced spent phenomenon (Japanese Patent applications Kokai 54-21730 and 58-40557, and Japanese Patent applications Kokoku (examined) 59-26945 and 59-131944). See also U.S. Pat. No. 5,068,301 and U.S. patent application Ser. Nos. 08/016,273 and 08/185,354.

Particularly in the case of silicone resins, the selection of monomers leads to a variety of molecular structures. Therefore, their selection enables one to prepare carriers with various levels in the amount of charge. In addition, the silicone resins are soluble in many solvents, which leads to many working advantages such as a uniform coating on the carrier surface and curing at relatively low temperature.

However, the conventionally used silicone resins which have methyl groups as an organic group are generally weak in their mechanical strength, although not as weak as acrylic resins. When carriers coated with silicone resins are used for prolonged time periods, the coating becomes worn, peels off and cracks, leading to a loss of the superior carrier characteristics. Therefore, the silicone resins were not satisfactory with respect to lifetime over a long period of use (i.e., durability), as well as with respect to stability of the charge characteristics.

Acrylic resins having fluorines have been proposed as a long lifetime coating agent (Japanese Patent applications Kokai 2-73372 and 2-103563). However, neither their lifetime nor the stability of their charge characteristics are sufficient enough.

A method to improve the problem by utilizing silicone compounds having tin compounds (Japanese Patent application Kokoku 2-3181) has been proposed. The disadvantages therein are an increase in the charge amount of the carriers as the number of copies made increases and a lack of stability of the charge characteristics.

A difficult investigation has been conducted in order to obtain a carrier with superior durability and superior stability of the charge characteristics. This investigation has led to the discovery of the present invention.

Therefore, an object of the invention is to provide coating agents for electrophotography carriers which are durable over a long period of use and possess superior stability of carrier charge characteristics.

Another object of the invention is to provide coating agents for electrophotography carriers which are resistant to wear, peel-off and cracks, and which prevent the occurrence of spent phenomenon.

A further object of the invention is to provide electrophotography carriers having a long lifetime and which possess reduced temperature dependency and improved stability.

Upon further study of the specification and appended claims, further objects and advantages of this invention will become apparent to those skilled in the art.

Briefly, these objects are achieved by the introduction of fluorine substituted alkyl groups into silicone resins. These provide not only superior charge characteristics of silicone resins but also other characteristics such as lubricity, peelability, and water repellency for the cured film on the carrier surface, due to the effect of the fluorine substituted alkyl groups. Further, the fluorinated silicone resins achieve reduced spent phenomena and prolong the lifetime of developers, as well as exhibit reduced temperature dependency and improved stability of the carrier charge characteristics.

In particular, the coating agents for electrophotography carriers in accordance with the invention are characterized by having as a main component an organopolysiloxane according to formula I:

$$R_a^f R_b^1 Si(OR^2)_c O_{(4-(a+b+c))/2} \qquad \text{I}$$

wherein $R^f$ is a group $C_p F_{2p+1} Q$, p is an integer of 1 to 12,

Q is a bivalent organic group with 2 to 12 carbon atoms, $R^1$ is an alkyl group with 1 to 12 carbon atoms or phenyl, $R^2$ is H or an alkyl group with 1 to 6 carbon atoms, and a, b and c are numbers which satisfy the following conditions:

$0 < a \leq 1, 0 b < 2, 0 \leq c \leq 3$ and $0 \leq a+b+c \leq 4$.

In addition to the organopolysiloxane according to formula I, the covering agents can contain, for example, silicone resins, crosslinking agents, and catalysts. In accordance with a preferred aspect of the invention, the covering agent comprises:

100 parts by weight of the organopolysiloxanes according to formula I;

0–1900 parts by weight of silicone resins;

0–100 parts by weight of crosslinking agents such as methyltrimethoxysilane, methyl-tris(methylethylketoxime)silane, dimethyldimethylethylketoximesilane, methyl-tris(isoproponoxy)silane, methyl-tris(acetoxy)silane, etc.; and 0–10 parts by weight of catalyst.

$R^f$ is a group expressed by $C_pF_{2p+1}Q$, wherein p indicates the number of carbon atoms in the perfluoroalkyl group. When the value of p exceeds 12, the compound loses solubility in organic solvents. Therefore, p is an integer of 1 to 12. Q is a branched or straight-chain alkylene group containing 2–12 C atoms and further optionally containing one or more —O—, —CO—, —NH—, —OCO— or —SO$_2$— groups or combinations thereof.

Examples of suitable bivalent organic groups Q are: —CH$_2$CH$_2$—, —CH$_2$OCH$_2$CH$_2$CH$_2$—, —CONHCH$_2$CH$_2$CH$_2$—, —CONHCH$_2$CH$_2$NHCH$_2$CH$_2$—CH$_2$—, —SO$_2$NHCH$_2$CH$_2$—, and —CH$_2$CH$_2$OCONHCH$_2$CH$_2$CH$_2$—.

Examples of suitable organopolysiloxanes of formula I are: hydrolyzed products of organic silicone compounds having a perfluoroalkyl group of the formula $R^fR_d^3Si(OR^4)_{3-d}$; hydrolyzed products of two or more types of said organic silicone compounds simultaneously; co-hydrolyzed products of said organic silicone compounds with alkoxy silanes; hydrolyzed products of chlorides of organic silicone compounds having a perfluoroalkyl group of the formula $R^fR_d^3SiCl_{3-d}$; and co-hydrolyzed products of said chlorides with chlorosilanes.

In the formulae above, $R^3$ is an alkyl group of 1–12 C atoms or phenyl; $R^4$ is an alkyl group with 1 to 6 carbon atoms, such as methyl, ethyl, n-propyl, isopropyl, n-butyl, isobutyl and sec.-butyl; and d is either 0 or 1. $R^4$ is preferebly methyl or ethyl with a high reactivity toward hydrolysis.

Examples of suitable organic silicone compounds having perfluoroalkyl groups are: CF$_3$CH$_2$CH$_2$Si(OCH$_3$)$_3$, C$_4$F$_9$CH$_2$CH$_2$Si(CH$_3$)(OCH$_3$)$_2$, C$_8$F$_{17}$CH$_2$CH$_2$Si(OCH$_3$)$_3$, C$_8$F$_{17}$CH$_2$CH$_2$Si(OC$_2$H$_5$)$_3$, (CF$_3$)$_2$CF(CF$_2$)$_8$CH$_2$CH$_2$Si(OCH$_3$)$_3$, C$_7$F$_{15}$CONHCH$_2$CH$_2$CH$_2$Si(OC$_2$H$_5$)$_3$,

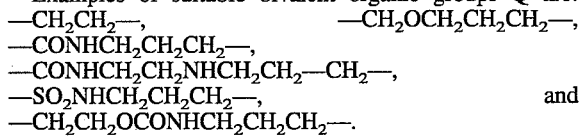

and C$_8$F$_{17}$CH$_2$CH$_2$OCONHCH$_2$CH$_2$CH$_2$ Si(OCH$_3$)$_3$.

Suitable alkoxy silanes are, for example $R_e^5Si(OR^6)_{4-e}$ wherein $R^5$ is $C_{1-12}$ organic group, $R^6$ is $C_{1-16}$ organic group and e is 0–3. Partial hydrolyzate of such alkoxy silanes may also be used.

Examples of alkoxy silanes suitable for co-hydrolysis with the organic silicone compounds having perfluoroalkyl groups are: methyl trimethoxy silane, methyl triethoxy silane, dimethyl dimethoxy silane, dimethyl diethoxy silane, phenyl trimethoxy silane, phenyl triethoxy silane, diphenyl dimethoxy silane, diphenyl diethoxy silane, methyl phenyl dimethoxy silane, methyl phenyl diethoxy silane, tetramethoxy silane and tetraethoxy silane.

The following are examples of suitable chlorides of the organic silicone compounds having perfluoroalkyl groups: CF$_3$CH$_2$CH$_2$SiCl$_3$, C$_4$F$_9$CH$_2$Si(CH$_3$)Cl$_2$, C$_8$F$_{17}$CH$_2$CH$_2$SiCl$_3$ and (CF$_3$)$_2$CF(CF$_2$)$_8$CH$_2$CH$_2$SiCl$_3$.

Suitable chlorosilanes for co-hydrolysis with the chlorides are, for example $R_e^5SiCl_{4-e}$ wherein $R^5$ is $C_{1-12}$ organic group and e is 0–3. Examples of suitable chlorosilanes are: methyl trichlorosilane, dimethyl dichlorosilane, phenyl trichlorosilane, diphenyl dichlorosilane, and methyl phenyl dichlorosilane.

Co-hydrolysis of the organic silicone compounds having perfluoroalkyl groups and the alkoxy silanes can be performed easily in the presence of known acid or alkali catalysts, e.g., methane sulfonic acid. Further, organic silicone compounds having perfluoroalkyl groups or the organopolysiloxanes of this invention can be used in combination with silicone resins such as silicone resins without perfluoroalkyl groups.

In order to cover the surface of the carrier body, curing catalysts are preferably used during curing of the covering agents in accordance with the invention. The curing catalysts used are preferably organometallic compounds of titanium, tin, zinc, cobalt, iron and aluminum or are amines. The curing catalysts may be used in combination with each other.

Examples of suitable organometallic compounds are: tetrabutyl titanate or its homopolymer; tetraisopropyl titanate or its homopolymer; dibutyl tin diacetate, dibutyl tin dioctanoate, and dibutyl tin dilaurate; naphthenates and octanoates of zinc, cobalt, and iron; γ-aminopropyl trimethoxy silane, γ-aminopropyl triethoxy silane, N-(β-aminoethyl)aminopropyl trimethoxy silane, γ-aminopropyl methyl diethoxy silane and N-(β-aminoethyl)aminopropyl methyl dimethoxy silane. Preferably, these catalysts are used in amounts of 0.05–5.0 parts by weight, based on 100 parts by weight of the polyorganosiloxane of formula I. At less than 0.5 parts by weight, the catalysts become less effective, whereas at greater than 5.0 parts by weight, the coating tends to become brittle.

Crosslinking agents such as methyltrimethoxysilane, methyl-tris(methylethylketoxime)silane, dimethyldimethylethylketoximesilane, methyl-tris(isoproponoxy)silane, and methyl-tris(acetoxy)silane, can also be added to the covering agent composition. Preferably, the amount of crosslinking agents is 10–50 parts by weight based on 100 parts by weight of organopolysiloxane of formula I. At less than 10 parts by weight of crosslinking agents, the coating becomes less stable. On the other hand, at greater than 50 parts by weight crosslinking agents, the coating tends to become brittle.

The central carrier bodies used in the invention are preferably iron powder and ferrite powder. Other known materials used as carrier bodies may also be employed, for example: magnetic metals such as nickel and cobalt, and their oxides; Carborundum; glass beads; and silicon dioxide. The particle size of the carrier center bodies is preferably 10–1,000 μm, especially 50–300 μm.

In accordance with the invention, compositions comprising the materials for the covering agents can be dissolved in organic solvents such as toluene, xylene, the hydrocarbon type solvents such as solvent gasoline, alcohols, and esters, as necessary. The central carrier bodies are then coated with the materials by suitable methods such as a fluidized bed process, impregnation techniques, and spray methods. The coated carrier particles are then dried and cured. The film thickness of the covering layer is preferably 0.1–20 μm. It is possible to coat the carrier particles with multiple layers, if desired. Each layer of the multi-layered compositions may be different, depending upon the purpose.

The silicone compositions of this invention may be cured at room temperature. However, it is preferred to cure the silicone compositions by heating to 100°–250° C., in order to stabilize the characteristics of the coating films and to increase production speed. There are no specific limitations for the toners utilized along with the carriers as a developer. Developers, which were prepared by dispersing known synthetic dyes into a wide variety of materials comprising the natural resins and composite resins may be utilized.

Composite resins are made of natural resins combined with synthetic resins.

As described above in detail, the coating agents for electrophotography carriers in accordance with the invention possess a resistance toward wear, peel-off and cracks. Furthermore, they prevent the occurrence of the spent phenomenon. They also are durable for a long period of use, and possess superior stability of carrier charge characteristics. In addition, the carriers which utilized the coating agents of the invention possess reduced temperature dependency and improved stability of the charge characteristics.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, unless otherwise indicated, all parts and percentages are by weight.

The entire disclosure of all applications, patents and publications, cited above and below, and of corresponding Japanese application 5-242102, filed Sep. 2, 1993, are hereby incorporated by reference.

EXAMPLES

Below this invention is explained in detail using examples. However, this invention is not limited to these Examples.

EXAMPLE 1

The following compounds were placed in a one-liter capacity flask equipped with a stirrer, a Liebig condenser, a dropping funnel and a thermometer: 84.7 g of the compound expressed by the average formula $CH_3(OCH_3)_2SiOSi(OCH_3)_2CH_3$, 21.8 g of the compound expressed by the formula $CF_3CH_2CH_2Si(OCH_3)_3$, 12.0 g of the compound expressed by the formula $(CH_3)_2Si(OCH_3)_2$, 3.7 g of the compound expressed by the formula $HO(CH_3)_2SiO[SiO(CH_3)_2]_8Si(CH_3)_2OH$, and 135.0 g of toluene. Then, after adding 3.8 g of methane sulfonic acid while stirring, 21.5 g of water was further added drop by drop over an hour time period. The mixture was then permitted to mature at 30° C. for 12 hours.

The obtained solution was neutralized. The alcohol by-product was eliminated by distillation, and then washed with water. After dehydration and filtration, the product was diluted with toluene to make the content of the nonvolatile component to be 40 wt. %. As a result, a silicone resin having fluorine substituted alkyl groups with 1.2 wt. % hydroxyl groups was obtained with a viscosity of 5 cs.

12 parts by weight of methyl tris(methyl ethyl ketoxime)silane and 0.4 part by weight of xylene solution containing 50 wt. % dibutyl tin dioctanoate were added to the 100 parts by weight of the obtained silicone resin. This mixture was added and mixed with gasoline so that the nonvolatile component content is 25 wt. %. The resultant solution of curable silicone resin having fluorine substituted alkyl groups had a viscosity of 1.5 cs. The silicone resin solution was then diluted with toluene to make a 4 wt. %. solution.

500 g of the silicone resin solution were sprayed onto carrier particles, i.e., 1 kg of ferrite with a 100 µm average particle size, using a fluidized bed instrument (Spiral Flow Mini: a trade name of the instrument manufactured by Freund Ind., Co., Ltd.). The silicone composition was cured by heat treatment at 150° C. for 10 minutes. 4 parts by weight of positive charge type toner (Able 3300/1300 series toner, a trade name of the product manufactured by Fuji Xerox Co., Ltd.) were added to 96 parts by weight of carrier powder treated by the method described above. The mixture was subjected to vibration. The charged amount of toner was measured by a blow-off powder charge meter, manufactured by Toshiba Chemical Co., Ltd. The results are presented in Table 1.

EXAMPLE 2

A silicone resin solution was prepared by the same method described in Example 1, except that the amount of compound expressed by the formula $CH_3(OCH_3)_2SiOSi(OCH_2)_2CH_3$ was 94.9 g and the 21.8 g of compound expressed by the formula $CF_3CH_2CH_2Si(OCH_3)_3$ was replaced by 5.7 g of the compound expressed by the formula $C_8F_{17}CH_2CH_2Si(OCH_3)_3$. The charged amount of toner was measured by the same method as in Example 1. The results are presented in Table 1.

Comparison Example 1

A silicone resin solution was prepared by the method described in Example 1, except that the amount of the compound expressed by the formula $CH_3(OCH_3)_2SiOSi(OCH_3)_2CH_3$ was changed to 96.0 g and the compound expressed by the formula $CF_3CH_2CH_2Si(OCH_3)_3$ was not used at all. The charged amount of toner was measured by the same method as in Example 1. The results are presented in Table 1.

TABLE 1

| Vibration Time | Charge Amount of Toner (µc/g) | | |
| --- | --- | --- | --- |
| | Ex. 1 | Ex. 2 | C. Ex. 1 |
| 15 minutes | −13.8 | −16.1 | −0.9 |
| 1 hour | −21.2 | −23.2 | −9.4 |
| 3 hours | −20.7 | −23.9 | −19.2 |
| 5 hours | −19.7 | −22.1 | −21.5 |
| 7 hours | −20.7 | −24.8 | −26.5 |
| 12 hours | −22.6 | −25.5 | −31.6 |

The results in Table 1 reveal that the toners used with carriers covered by the coating agents of the invention show a rapid rise in the charge amount, as well as the stable charge without an increase of charge amount with time (a charge-up). The results prove the effectiveness of this invention.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A carrier particle composition comprising carrier particles covered with a covering agent, wherein said carrier particles have a particle size of 10–1,000 µm and are particles of magnetic metals, particles of magnetic metal oxides, particles of Carborundum, glass beads or particles of silicon dioxide, and said covering agent contains one or more organopolysiloxane(s) of formula I:

$$R_a^f R_b^1 Si(OR^2)_c O_{(4-(a+b+c))/2} \quad \text{I}$$

wherein $R^f$ is $C_p F_{2p+1} Q$;

P is 1–12;

Q is a bivalent organic group with 2–12 carbon atoms;

$R^1$ is alkyl with 1–12 carbon atoms or phenyl;

$R^2$ is H or alkyl with 1–6 carbon atoms; and a, b and c are numbers satisfying the following conditions: $0 < a \leq 1$, $0 \leq b < 2$, $0 \leq c \leq 3$, and $0 < a+b+c < 4$, wherein said covering agent is applied to said carrier particles as a composition comprising an organic solvent and one or more organopolysiloxanes of formula I.

2. A composition according to claim 1, wherein said covering agent further contains 0.05–5 parts by weight of catalyst based on 100 parts by weight of said organopolysiloxanes of formula I.

3. A composition according to claim 2, wherein said covering agent further contains 10–50 parts by weight of crosslinking agent based on 100 parts by weight of said organopolysiloxane of formula I.

4. A composition according to claim 3, wherein said crosslinking agent is methyltrimethoxysilane, methyl-tris-(methylethylketoxime)silane, dimethyldimethylethylketoximesilane, methyl-tris(isoproponoxy)silane, or methyl-tris(acetoxy)silane.

5. A composition according to claim 1, wherein said covering agent further contains a silicone resin.

6. A composition according to claim 1, wherein said covering agent further contains a crosslinking agent.

7. A composition according to claim 6, wherein said crosslinking agent is methyltrimethoxysilane, methyl-tris-(methylethylketoxime)silane, dimethyldimethylethylketoximesilane, methyl-tris(isoproponoxy)silane, or methyl-tris(acetoxy)silane.

8. A composition according to claim 1, wherein said carrier particle composition comprises said carrier particles covered with a composition comprising said covering agent and said organic solvent.

9. A developer composition comprising:

toner particles and a carrier particle composition comprising carrier particles covered with a covering agent, wherein said carrier particles have a particle size of 10–1,000 μm and are particles of magnetic metals, particles of magnetic metal oxides, particles of Carborundum, glass beads or particles of silicon dioxide, said covering agent contains one or more organopolysiloxane(s) of formula I:

$$R_a^f R_b^1 Si(OR^2)_c O_{(4-(a+b+c))/2} \quad \text{I}$$

wherein $R^f$ is $C_p F_{2p+1} Q$;

p is 1–12;

Q is a bivalent organic group with 2–12 carbon atoms;

$R^1$ is alkyl with 1–12 carbon atoms or phenyl;

$R^2$ is H or alkyl with 1–6 carbon atoms; and a, b and c are numbers satisfying the following conditions: $0 < a \leq 1$, $0 \leq b < 2$, $0 \leq c \leq 3$, and $0 < a+b+c < 4$, wherein said covering agent is applied to said carrier particles as a composition comprising an organic solvent and one or more polysiloxane(s) of formula I.

10. A process of coating electrophotography carrier particles comprising coating said carrier particles with a covering agent composition comprising an organic solvent and one or more organopolysiloxane(s) of formula I:

$$R_a^f R_b^1 Si(OR^2)_c O_{(4-(a+b+c))/2} \quad \text{I}$$

wherein $R^f$ is $C_p F_{2p+1} Q$;

p is 1–12;

Q is a bivalent organic group with 2–12 carbon atoms;

$R^1$ is alkyl with 1–12 carbon atoms or phenyl;

$R^2$ is H or alkyl with 1–6 carbon atoms; and a, b and c are numbers satisfying the following conditions: $0 < a \leq 1$, $0 \leq b < 2$, $0 \leq c \leq 3$, and $0 < a+b+c < 4$.

11. A process according to claim 10, wherein said composition further contains 0.05–5 parts by weight of catalyst based on 100 parts by weight of said one or more organopolysiloxane(s) of formula I.

12. A process according to claim 11, wherein said composition further contains 10–50 parts by weight of crosslinking agent based on 100 parts by weight of said one or more organopolysiloxane(s) of formula I.

13. A process according to claim 10, wherein Q is —$CH_2CH_2$—, —$CH_2OCH_2CH_2CH_2$—, —$CONHCH_2CH_2CH_2$—, —$CONHCH_2CH_2NHCH_2CH_2CH_2$—, —$SO_2NHCH_2CH_2CH_2$—, or —$CH_2CH_2OCONHCH_2CH_2CH_2$—.

14. A process according to claim 10, wherein said one or more organopolysiloxane(s) of formula I is a hydrolyzed product of an organo silicone compound of the formula $R^f R_d^3 Si(OR^4)_{3-d}$, wherein $R^f$ is as defined above, $R^3$ is an alkyl group of 1–12 C atoms, $R^4$ is an alkyl group of 1–6 C atoms, and d is 0 or 1.

15. A process according to claim 10, wherein said one or more organopolysiloxane(s) of formula I is a hydrolyzed product of two or more different organo silicone compounds of the formula $R^f R_d^3 Si(OR^4)_{3-d}$, wherein $R^f$ is as defined above, $R^3$ is an alkyl group of 1–12 C atoms, $R^4$ is an alkyl group of 1–6 C atoms, and d is 0 or 1.

16. A process according to claim 10, wherein said one or more organopolysiloxane(s) of formula I is a co-hydrolyzed product of an alkoxy silane and an organo silicone compound of the formula $R^f R_d^3 Si(OR^4)_{3-d}$, wherein $R^f$ is as defined above, $R^3$ is an alkyl group of 1–12 C atoms, $R^4$ is an alkyl group of 1–6 C atoms, and d is 0 or 1.

17. A process according to claim 10, wherein said one or more organopolysiloxane(s) of formula I is a hydrolyzed product of an organo silicone chloride compound of the formula $R^f R_d^3 SiCl_{3-d}$, wherein $R^f$ is as defined above, $R^3$ is an alkyl group of 1–12 C atoms, and d is 0 or 1.

18. A process according to claim 10, wherein said one or more organopolysiloxane(s) of formula I is a co-hydrolyzed product of a chlorosilane and an organic silicone chloride of the formula $R^f R_d^3 SiCl_{3-d}$, wherein $R^f$ is as defined above, $R^3$ is an alkyl group of 1–12 C atoms, and d is 0 or 1.

19. A process according to claim 10, wherein said carrier particles have a particle size of 10–1000 μm.

20. A process according to claim 10, further comprising curing said covering agent composition at a temperature of 100°–250° C.

21. Electrophotography carrier particles prepared by:

coating electrophotography carrier particles with a covering agent composition comprising an organic solvent and one or more organopolysiloxane(s) of formula I:

$R^f_a R^1_b Si(OR^2)_c O_{(4-(a+b+c))/2}$   I wherein
 $R^f$ is $C_p F_{2p+1} Q$;
 p is 1–12;
 Q is a bivalent organic group with 2–12 carbon atoms;
 $R^1$ is alkyl with 1–12 carbon atoms or phenyl;
 $R^2$ is H or alkyl with 1–6 carbon atoms; and
 a, b and c are numbers satisfying the following conditions: $0 < a \leq 1$, $0 \leq b < 2$, $0 \leq c \leq 3$, and $0 < a+b+c < 4$.

* * * * *